US008625641B2

(12) United States Patent
Liang (10) Patent No.: US 8,625,641 B2
(45) Date of Patent: Jan. 7, 2014

(54) APPARATUS, METHOD, AND SYSTEM FOR SYNCHRONIZING TIME (75) Inventor: Bing Liang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 263 days.

(21) Appl. No.: 13/250,324

(22) Filed: Sep. 30, 2011

(65) Prior Publication Data

US 2012/0020376 A1    Jan. 26, 2012

Related U.S. Application Data (63) Continuation of application No. PCT/CN2010/071519, filed on Apr. 2, 2010.

(30) Foreign Application Priority Data

Apr. 2, 2009    (CN) .......................... 2009 1 0106520

(51) Int. Cl.
*H04J 3/06*      (2006.01)

(52) U.S. Cl.
USPC .......................................................... 370/503

(58) Field of Classification Search
None
See application file for complete search history.

(56) References Cited

U.S. PATENT DOCUMENTS

| | | | |
|---|---|---|---|
| 8,116,405 B2 * | 2/2012 | Cho et al. ...................... | 375/316 |
| 2006/0209901 A1 | 9/2006 | Kim | |
| 2008/0075217 A1 | 3/2008 | Ilnicki et al. | |

FOREIGN PATENT DOCUMENTS

| | | | |
|---|---|---|---|
| CN | 1866803 | A | 11/2006 |
| CN | 1866813 | A | 11/2006 |
| CN | 1925386 | A | 3/2007 |
| CN | 101296048 | A | 10/2007 |
| CN | 101252404 | A | 8/2008 |
| CN | 101296070 | A | 10/2008 |
| CN | 101299749 | A | 11/2008 |
| CN | 101345763 | A | 1/2009 |
| CN | 101534185 | A | 9/2009 |
| WO | 2008/093600 | A1 | 8/2008 |
| WO | WO 2008103170 | A1 | 8/2008 |

OTHER PUBLICATIONS

International Search Report in corresponding PCT Application No. PCT/CN2010/071519 (Jul. 8, 2010).
Written Opinion of the International Searching Authority in corresponding PCT Application No. PCT/CN2010/071519 (Jul. 8, 2010).

(Continued)

*Primary Examiner* — Kibrom T Hailu
(74) *Attorney, Agent, or Firm* — Leydig, Voit & Mayer, Ltd.

(57) ABSTRACT

The present invention relates to an apparatus, method and system for synchronizing time. The method includes: extracting line clock frequency information from an input line code stream, and extracting a time synchronization packet from a packet stream corresponding to the input line code stream; sending the input line code stream after extracting the line clock frequency information and the time synchronization packet to a packet switching device; receiving an output line code stream sent by the packet switching device; and calibrating local time according to the line clock frequency information and the time synchronization packet, recovering line clock frequency information of the output line code stream according to the calibrated local time, and inserting a time synchronization response packet into a packet stream corresponding to the output line code stream. In this way, the time synchronization network may be deployed without requiring the packet switching device to support time synchronization.

9 Claims, 5 Drawing Sheets

(56) References Cited

OTHER PUBLICATIONS

Extended European Search Report in corresponding European Patent Application No. 10758065.6 (Apr. 20, 2012).
He et al., "XP015059948—Time Synchronization Method in Packet-Switched Transport Network for Mobile Backhaul," Internet Draft, Oct. 27, 2008, Internet Society, Geneva, Switzerland.
Jasperneite et al., "XP010756406—Enhancements to the Time Synchronization Standard IEEE-1588 for a System of Cascaded Bridges," IEEE International Workshop, Sep. 22, 2004, IEEE, Piscataway, New Jersey.
Rodrigues, "XP031161293—IEEE-1588 and Synchronous Ethernet in Telecom," International IEEE Symposium on Precision Clock Synchronization for Measurement, Control, and Communication, Oct. 1, 2007, IEEE, Piscataway, New Jersey.

* cited by examiner

APPARATUS, METHOD, AND SYSTEM FOR SYNCHRONIZING TIME

CROSS-REFERENCE TO RELATED APPLICATIONS

This application is a continuation of International Application No. PCT/CN2010/071519, filed on Apr. 2, 2010, which claims priority to Chinese Patent Application No. 200910106520.X, filed on Apr. 2, 2009, both of which are hereby incorporated by reference in their entireties.

FIELD OF THE INVENTION

The present invention relates to the network communication field, and in particular, to an apparatus, a method and a system for synchronizing time.

BACKGROUND OF THE INVENTION

Synchronization is a commonly used term in communication networks. Synchronization includes frequency synchronization and time synchronization.

The frequency synchronization is also known as clock synchronization, and means that the working clock frequency value of one device maintains a strict fixed specific relation with that of another device being separate from said one device. The strict fixed specific relation is the same or is in a fixed proportion. For example, if device A works at 2048000.000 Hz and device B works at 4096000.000 Hz, device A is synchronized with device B; if device B works at 4096001 Hz, device A is not synchronized with device B. The synchronicity is not completely precise, and allows for a certain range of errors. Generally, the precision is required to be within several Parts Per Billion (ppb).

The pulses transmitted in a digital communication network are Pulse Code Modulation (PCM) discrete pulses which derive from coded information. If the clock frequency of one digital switching device is inconsistent with that of another digital switching device, or, if phase drift and jitters is superimposed after the digital bit streams are impaired by interference in the transmission process, code elements may be lost or repeated in the buffer store of the digital switching system, causing slip impairment in the transmitted bit streams.

The time synchronization is also known as clock phase synchronization, and means that the internal time of one device and that of another device being separate from said one device are the same (in the range of allowable error). Supposing that at specific time, the time recorded by device A is 18:01, and the time recorded by device B is also 18:01, the time recorded by said one device and that recorded by said another device are synchronized. Different demands require different precision of time synchronization. General computer applications need to be accurate to milliseconds, and mobile communication technologies need to be accurate to microseconds.

The time synchronization differs from the frequency synchronization in that: If the time of one device and that of another device are always consistent, this state is called the time synchronization (or phase synchronization); if the time of one device is different from that of another device, but the difference is constant, this state is called the frequency synchronization.

Phase-Locked Loop (PLL) is a commonly used synchronization technology, and has three main functional modules: a frequency division phase discriminator, a low-pass filter, and a voltage-controlled oscillator.

The voltage-controlled oscillator may output clock frequency independently, and change the output frequency according to an input voltage signal. The frequency division phase discriminator is configured to compare the speed of two frequencies. The low-pass filter may convert this speed information into voltage information, and meanwhile filter some jitters out.

Traditional telecom networks have a perfect mechanism for publishing line clock frequencies. A clock source provides an external line interface, and synchronizes the clock frequency of the external interface with its internal frequency (such as atomic clock frequency). A downstream device recovers clock from the line first, and then synchronizes its internal clock with the line clock, and finally synchronizes all line output clocks with the internal clock. In this way, the whole network may be synchronized to be in a same clock frequency.

Ethernet is an asynchronous network, and does not require the same working frequency between separate devices. Definitely, to ensure interworking between devices, the clock frequency difference between devices is limited to 100 ppm, which is 2000 times greater than the clock frequency difference in the traditional telecom network (namely 50 ppb).

IP-based network is an irresistible trend for the future network, so it is necessary to provide synchronization features in IP networks. At present, the IP network should provide performance of 50 ppb clock frequency synchronization and 3-microsecond time synchronization.

BITS is short for Building integrated time system. Building Integrated Time System (BITS) networks can provide clock synchronization function for communication equipment in the equipment room of buildings. A BITS network includes a local clock source and a cabling network in the building. However, a BITS device, in fact, merely refers to a clock source device, which is generally a rubidium atomic clock with GPS calibration in communication applications.

The local clock source inside the BITS device is output to devices requiring clocks through a dedicated interface. A mainstream clock interface is a frequency interface capable of outputting a clock frequency of 2 MHz/2M bits, and is generally known as a BITS interface.

Another interface is One Pulse per Second (1PPS) interface, which is a time interface, namely, outputs a time pulse signal per second.

The BITS interface and the 1PPS interface are key interfaces indispensible to clock devices.

Synchronous Ethernet is a technology to recover clocks by adopting Ethernet link code streams. As mentioned above, Ethernet is an asynchronous system and can work normally without requiring high-precision clocks, so general Ethernet devices do not provide high-precision clocks. But that does not mean the Ethernet is incapable of providing high-precision clocks. In fact, on the physical layer, the Ethernet transmits signals in the form of serial code streams like the traditional optical network device, and a receiver must have clock recovery function. If the receiver does not have the clock recovery function, communication is impossible. In other words, the Ethernet itself is capable of transmitting clocks, but the capability is not put into use.

In a synchronous Ethernet, the transmitter imports a high-precision clock into the physical-layer chip of the Ethernet, and the physical-layer chip uses the high-precision clock to send data. The physical-layer chip in the receiver may extract the clock out of the line code stream, and during this process the clock precision is not impaired. That is the basic principles of the synchronous Ethernet.

Same as traditional telecom optical network devices, the synchronous network technology needs support of the whole network. As long as one device on the clock link does not support the synchronous Ethernet, the downstream devices are all incapable of obtaining the clock frequency. However, almost none of the existing IP networks support the synchronous Ethernet. Therefore, the deployment of a synchronous Ethernet requires replacement of devices throughout the whole network, which is not practicable. Moreover, the synchronous Ethernet supports the frequency synchronization only, but does not support the time synchronization.

Currently, the main solutions to time synchronization on an Internet Protocol (IP) network are: Network Time Protocol (NTP), and a precise clock synchronization protocol of a network measurement and control system (IEEE1588). The NTP is mature and widely supported, but provides precision as low as milliseconds, which is far from enough to meet requirements.

The basic synchronization procedures of the IEEE1588 include: A slave clock sends a time synchronization packet that carries a timestamp to a master clock; the master clock receives the packet and returns a time synchronization response packet, and records the local time at the moment of receiving the packet and the local time at the moment of sending the response packet into the time synchronization response packet; the slave clock calculates the bidirectional delays between the slave clock and the peer clock according to four timestamps; supposing that the bidirectional delays are equal, the slave clock can calculate the difference between the local time and the remote time, and then adjust the local time accordingly until the local time is synchronized with the peer time.

The IEEE 1588 theoretically depends on a prerequisite, that is, the bidirectional delays for a packet are equal. Delay in an IP network may be divided into two types: line delay and device forwarding delay. The line delay is fixed, and the bidirectional delays for the packet are equal after the factor that the fiber path for sending the packet is not equal to the fiber path for receiving the packet is eliminated. The forwarding delay is caused by the devices which store and forward packets (such as routers and switches). The forwarding delay is uncertain, and changes between microseconds and milliseconds. When the IP network is congested, the forwarding delay is even longer.

In order to improve synchronization precision, many devices adopt a processing method of internal shunting. For IEEE1588 packets, the uplink interface extracts time information, and sends the time information to the downstream interface through an out-band channel (bypassing the switching chip), and the packet is sent out of the downlink interface. In this way, the uncertainty of the delay caused by the switching chip is eliminated, and the final precision can meet requirements.

The IEEE1588 needs to be deployed throughout the network. If any device on the clock link does not support the IEEE1588, the downstream devices are incapable of obtaining enough precise synchronization. The upgrade of the existing IP network requires replacement of devices throughout the whole network, which is hard to realize.

SUMMARY OF THE INVENTION

Embodiments of the present invention are directed to providing an apparatus, a method and a system for synchronizing time to upgrade an existing IP network to a time synchronization network.

Objectives of the embodiments of the present invention are realized through the following technical solution:

A time synchronization apparatus includes a processing module, at least one inputting module, and at least one outputting module.

The inputting module is configured to extract line clock frequency information from an input line code stream, extract a time synchronization packet from a packet stream corresponding to the input line code stream, and send the line clock frequency information and the time synchronization packet to the processing module;

The processing module is configured to calibrate local time according to the line clock frequency information and the time synchronization packet, and send a time synchronization response packet and line clock frequency recovery information according to the calibrated local time; and The outputting module is configured to insert the time synchronization response packet sent by the processing module into a packet stream corresponding to an output line code stream, and recover line clock frequency information of the output line code stream according to the line clock frequency recovery information sent by the processing module.

A time synchronization method includes:

extracting line clock frequency information from an input line code stream, and extracting a time synchronization packet from a packet stream corresponding to the input line code stream;

sending the input line code stream after extracting the line clock frequency information and the time synchronization packet in the corresponding packet stream to a packet switching device;

receiving an output line code stream sent by the packet switching device; and calibrating local time according to the line clock frequency information and the time synchronization packet, recovering line clock frequency information of the output line code stream according to the calibrated local time, and inserting a time synchronization response packet into a packet stream corresponding to the output line code stream.

A time synchronization network includes:

a time synchronization apparatus, configured to: extract line clock frequency information from an input line code stream, extract a time synchronization packet from a packet stream corresponding to the input line code stream, and send the input line code stream after extracting the line clock frequency information and the time synchronization packet in the corresponding packet stream to a packet switching device; receive an output line code stream sent by the packet switching device, calibrate local time according to the line clock frequency information and the time synchronization packet, recover line clock frequency information of the output line code stream according to the calibrated local time, and insert a time synchronization response packet into a packet stream corresponding to the output line code stream; and a packet switching device, configured to receive the input line code stream, forward the packet stream corresponding to the input line code stream to a corresponding interface, and use a line code stream corresponding to the packet stream on the corresponding interface as output line code stream and send the output line code stream to the time synchronization apparatus.

According to technical solutions provided by the embodiments of the present invention, the line clock frequency information is extracted from the input line code stream, and the time synchronization packet is extracted from the packet stream corresponding to the input line code stream. In this way, the clock path is isolated from the service path, and the time synchronization network may be deployed without requiring the packet switching device to support the time synchronization function, and the existing IP network can be upgraded to the time synchronization network smoothly.

DETAILED DESCRIPTION OF THE EMBODIMENTS

Figure 1:
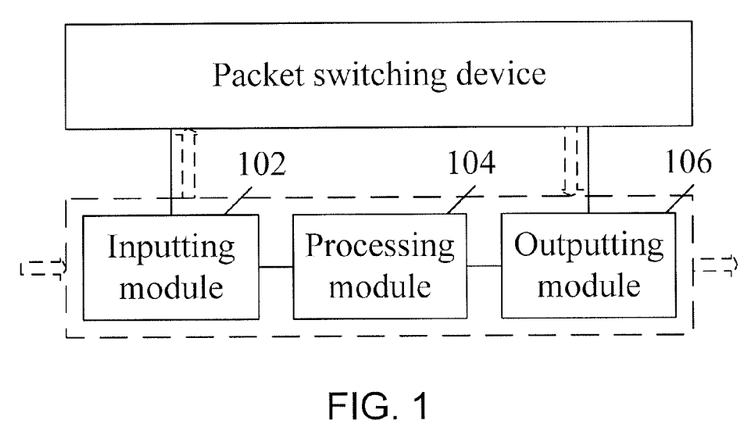
FIG. 1 is a block diagram of a time synchronization apparatus according to an embodiment of the present invention.
Figure 2:
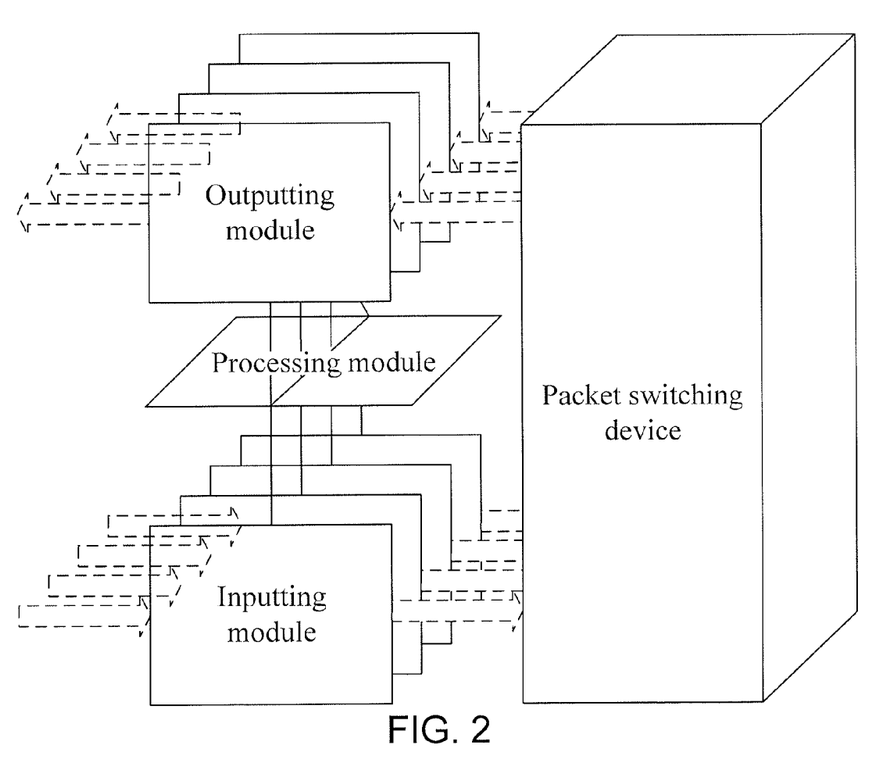
FIG. 2 is a schematic diagram of a time synchronization apparatus according to an embodiment of the present invention.

The following describes an embodiment of the present invention with reference to FIG. 1 and FIG. 2.

FIG. 1 is a block diagram of a time synchronization apparatus according to an embodiment of the present invention. The apparatus includes at least one inputting module 102, a processing module 104, and at least one outputting module 106.

The inputting module 102 is configured to extract line clock frequency information from an input line code stream, extract a time synchronization packet from a packet stream corresponding to the input line code stream, and send the line clock frequency information and the time synchronization packet to the processing module 104. For example, the time synchronization packet may include an IEEE1588 time synchronization packet or an NTP time synchronization packet, or other packets with the function of time synchronization. The line code streams include the code streams transmitted in the form of optical signals or electric signals on the physical layer. The input line code streams include the line code stream sent from the network side to the packet switching device.

For example, supposing that the time synchronization packet is an IEEE1588 packet, the physical-layer chip in the inputting module 102 extracts line clock frequency information including clock frequency from an input line code stream, and sends the line clock frequency information to the processing module. The inputting module 102 further extracts an IEEE1588 time synchronization packet from the packet stream corresponding to the input line code stream, and sends this packet to the processing module 104.

The processing module 104 is configured to calibrate local time according to the line clock frequency information and the time synchronization packet, send a time synchronization response packet according to the calibrated local time, and send line clock frequency recovery information according to the frequency of the calibrated local time. When a precise external clock source exists on the time synchronization apparatus locally, a time pulse signal and/or frequency signal of the external clock source may also serve as a basis for calibrating the local time. The precise external clock source may be a Global Positioning System (GPS), an atomic clock such as rubidium atomic clock, cesium atomic clock, hydrogen atomic clock or any other precise clock sources known by persons of ordinary skill in the art.

For example, supposing that the time synchronization packet is an IEEE1588 packet and a precise external clock source exists on the time synchronization apparatus locally, the processing module 104 receives IPPS time pulse signals provided by the 1PPS interface of the external clock source, and the BITS frequency signals provided by the frequency interface of the external clock source; and calibrates the local time according to the line clock frequency information and the IEEE1588 time synchronization packet sent by the inputting module 102, where the line clock frequency information includes a clock frequency. The processing module 104 sends an IEEE1588 time synchronization response packet and line clock frequency recovery information including the calibrated clock frequency to the outputting module 106 according to the calibrated local time.

The outputting module 106 is configured to insert the time synchronization response packet sent by the processing module into a packet stream corresponding to an output line code stream, and recover line clock frequency information of the output line code stream according to the line clock frequency recovery information sent by the processing module. For example, the time synchronization response packet include an IEEE1588 time synchronization response packet or an NTP time synchronization response packet, or an IEEE1588 time synchronization packet or NTP time synchronization packet sent by the processing module 104 actively. The output line code streams include the line code stream sent from the packet switching device to the network.

For example, supposing that the time synchronization response packet is an IEEE1588 response packet, the outputting module 106 inserts the IEEE1588 time synchronization response packet sent by the processing module 104 into the packet stream corresponding to the output line code stream, and recovers line clock frequency information of the output line code stream by using the calibrated clock frequency in the line clock frequency recovery information.

The time synchronization apparatus in the foregoing embodiment may be realized in an optical-electric conversion apparatus or optical-electric-optical conversion device as required, for example, optical switch, optical transceiver, or optical modem. According to different devices, the inputting module 102 is further configured to perform optical-electric conversation or optical-electric-optical conversion for the input line code stream; and the outputting module 106 is further configured to perform electric-optical conversion or optical-electric-optical conversion for the output line code stream.

FIG. 2 is a schematic diagram of a time synchronization apparatus according to an embodiment of the present invention. When the packet switching device does not support time synchronization, no packet switching device needs to be replaced, but only a time synchronization apparatus needs to be added and connected to the packet switching device, so as to achieve the time synchronization. After being processed by the inputting module of the time synchronization apparatus, the packet stream on the network side is sent to the packet switching device. The packet stream processed by the packet switching device is sent to the time synchronization apparatus, and the outputting module processes the packet stream and sends it to the network side. The inputting module and the outputting module are logical components, and may be physical components of the same or different structures. For example, the packet switching device may be a router, a network bridge, a switch, an optical transceiver, or an optical modem. According to the specific conditions of the packet switching device and networking, different numbers of inputting modules and outputting modules may be set. In practice, the time synchronization apparatus with different interface number and different interface types may be designed. The interface type may be Ethernet interfaces of various specifications, Packet Over SONET/SDH (POS) interface, Optical Transport Network (OTN) interface, Asynchronous Transfer Mode (ATM) interface, or any other interfaces known by persons of ordinary skill in the art.

Figure 3:
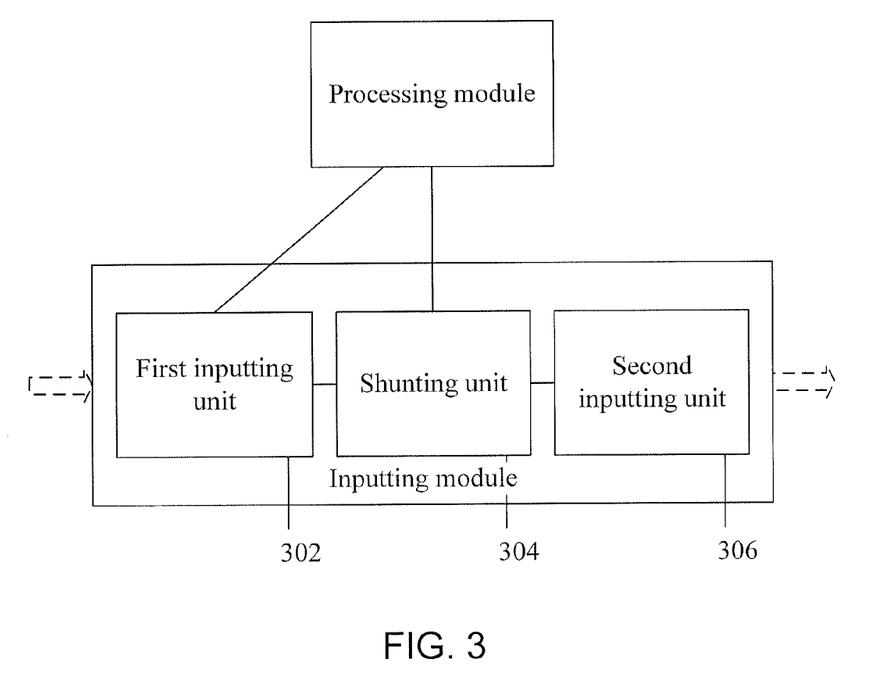
FIG. 3 is a block diagram of an inputting module according to an embodiment of the present invention.

The following describes an embodiment of the present invention with reference to FIG. 3.

FIG. 3 is a block diagram of an inputting module according to an embodiment of the present invention. The inputting module includes: a first inputting unit 302, a shunting unit 304, and a second inputting unit 306.

The first inputting unit 302 is configured to terminate the physical-layer codes of the input line code stream, extract the line clock frequency information, send the line clock frequency information to the processing module, and send the processed input line code stream to the shunting unit.

For example, the physical-layer chip in the first inputting unit 302 terminates the physical-layer codes of the input line code stream, and converts serial signals into parallel signals to be processed by the downstream device. The first inputting unit 302 is further configured to extract line clock frequency information including the clock frequency, and send the line clock frequency information to the processing module. According to different devices, the first inputting module 302 may perform optical-electric conversion when terminating the physical-layer codes of the input line code stream, and convert the input line code stream over optical signals into an input line code stream over electric signals.

The shunting unit 304 is configured to identify the corresponding packet stream in the input line code stream; extract the time synchronization packet when the packet in the packet stream is the time synchronization packet and the destination address of the time synchronization packet matches the local address; send the time synchronization packet to the processing module; and send the processed input line code stream to the second inputting unit.

For example, supposing that the time synchronization packet is an IEEE1588 packet, the shunting unit 304 recovers the packet stream from the input line code stream, identifies the format of the packet in the packet stream, judges the function of the packet, and sends the packet to the second inputting unit 306 directly if the packet is an ordinary Ethernet packet, or intercepts the packet and sends it to the processing module if the packet is an IEEE1588 packet and the destination address of the IEEE1588 packet matches the local address, or intercepts the packet and transmits it transparently if the packet is an IEEE1588 packet but the destination address of the packet does not match the local address.

The second inputting unit 306 is configured to recover the physical-layer codes of the input line code stream.

For example, the physical-layer chip in the second inputting unit 306 converts parallel signals into serial signals, and recovers the physical-layer codes of the input line code stream. In some application scenarios, the second inputting unit 306 may further recover the line clock frequency information of the input line code stream by using the calibrated clock frequency in the line clock frequency recovery information sent by the processing module. According to different devices, the second inputting module 306 may further perform electric-optical conversion when recovering the physical-layer codes of the input line code stream, and convert the input line code stream over electric signals into an input line code stream over optical signals.

Figure 4:
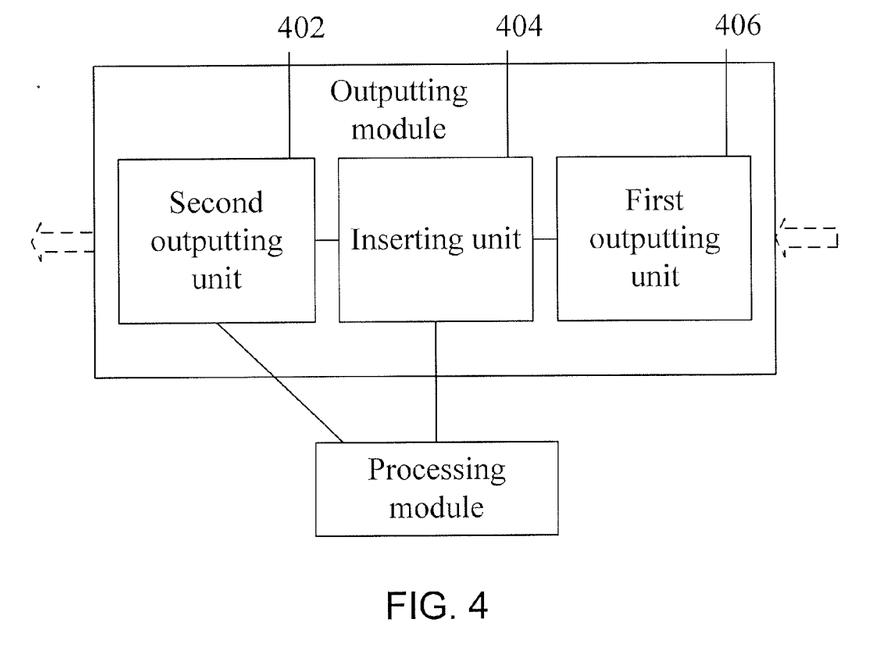
FIG. 4 is a block diagram of an outputting module according to an embodiment of the present invention.

The following describes an embodiment of the present invention with reference to FIG. 4.

FIG. 4 is a block diagram of an outputting module according to an embodiment of the present invention. The outputting module includes: a first outputting unit 402, an inserting unit 404, and a second outputting unit 406.

The first outputting unit 402 is configured to terminate the physical-layer codes of the output line code stream, and send the processed output line code stream to the inserting unit.

For example, the physical-layer chip in the first outputting unit 402 terminates the physical-layer codes of the output line code stream, and converts serial signals into parallel signals to be processed by the downstream device. In some application scenarios, the first outputting unit 402 is further configured to extract line clock frequency information including the clock frequency from the output line code stream, and send the line clock frequency information to the processing module. According to different devices, the first outputting module 402 may perform optical-electric conversion when terminating the physical-layer codes of the input line code stream, and convert the input line code stream over optical signals into an input line code stream over electric signals.

The inserting unit 404 is configured to insert the time synchronization response packet sent by the processing module into the packet stream corresponding to the output line code stream. For example, the time synchronization response packet includes an IEEE1588 time synchronization response packet or an NTP time synchronization response packet, or an IEEE1588 time synchronization packet or NTP time synchronization packet actively sent by the processing module. The processed output line code stream is sent to the second outputting unit.

For example, supposing that the time synchronization response packet is an IEEE1588 response packet, the inserting unit 404 inserts the IEEE1588 time synchronization response packet sent by the processing module into the packet stream corresponding to the output line code stream.

The second outputting unit 406 is configured to recover the physical-layer codes of the output line code stream, and recover the line clock frequency information of the output line code stream according to the line clock frequency recovery information sent by the processing module.

For example, the second outputting unit 406 recovers the line clock frequency information of the output line code stream by using the calibrated clock frequency in the line clock frequency recovery information sent by the processing module. The physical-layer chip in the second outputting unit 406 converts parallel signals into serial signals, and recovers the physical-layer codes of the output line code stream. According to different devices, the second outputting module 406 may perform electric-optical conversion when recovering the physical-layer codes of the output line code stream, and convert the output line code stream over electric signals into an output line code stream over optical signals.

Figure 5:
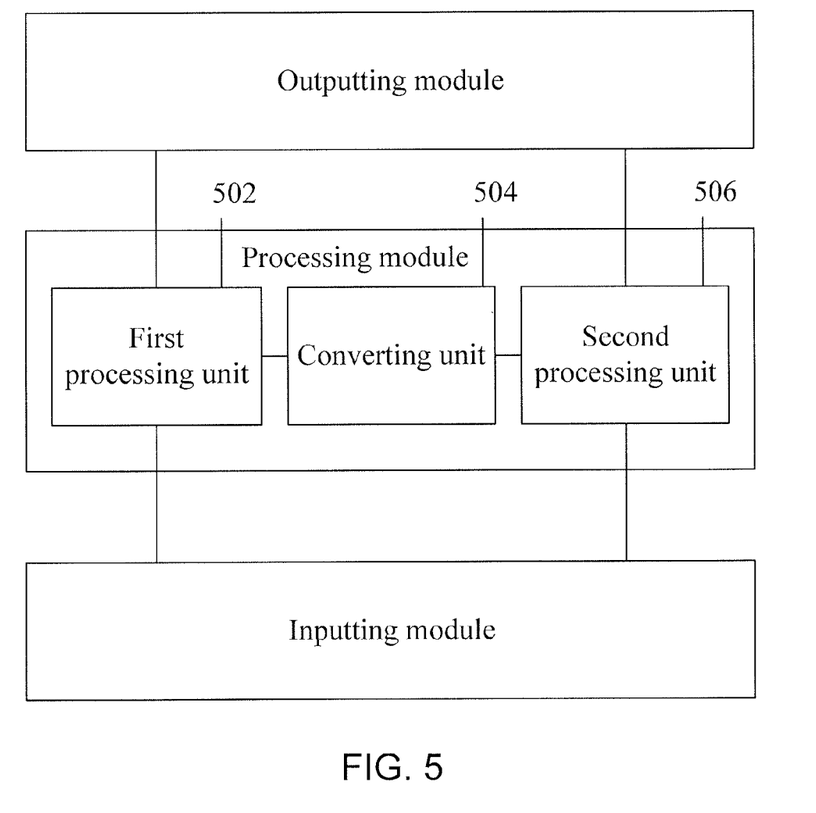
FIG. 5 is a block diagram of a processing module according to an embodiment of the present invention.

The following describes an embodiment of the present invention with reference to FIG. 5.

FIG. 5 is a block diagram of a processing module according to an embodiment of the present invention. The processing module includes: a first processing unit 502, a converting unit 504, and a second processing unit 506.

The first processing unit 502 is configured to calibrate system time according to the time synchronization packet and the reference frequency sent by the converting unit 504, send a system time pulse signal to the converting unit 504 according to the calibrated system time, and send the time synchronization response packet. When a precise external clock source exists on the time synchronization apparatus locally, the time pulse signal of the external clock source may also serve as a basis for calibrating the system time.

For example, supposing that the time synchronization packet is an IEEE1588 packet and a precise external clock source exists on the time synchronization apparatus locally, the first processing unit 502 receives 1PPS time pulse signals sent by the IPPS interface of the external clock source, the IEEE1588 time synchronization packet sent by the inputting module, and the reference frequency sent by the converting unit 504. System time is obtained through a priority algorithm according to the 1PPS time pulse signal and the IEEE1588 time synchronization packet. The IPPS time pulse signal and the IEEE1588 time synchronization packet are not continuous. The system time still goes on running when no calibration of the system time occurs, and the running of the system time is maintained according to the reference frequency provided by the converting unit 504. The first processing unit 502 sends a 1PPS system time pulse signal to the converting unit 504 according to the calibrated system time, and sends an IEEE1588 time synchronization response packet.

The converting unit 504 is configured to calibrate local time according to the system time pulse signal sent by the first processing unit 502 and the calibrated frequency sent by the second processing unit 506, and send a reference frequency to the first processing unit 502 and the second processing unit 506 according to the calibrated local time.

For example, the converting unit 504 receives a 1PPS system time pulse signal sent by the first processing unit 502 and the calibrated frequency sent by the second processing unit 506. The local time is calibrated according to the IPPS system time pulse signal sent by the first processing unit 502. When no calibration of the local time occurs, the running of the local time is maintained according to the calibrated frequency sent by the second processing unit 506.

The second processing unit 506 is configured to calibrate the local frequency according to the line clock frequency information and the reference frequency sent by the converting unit 504, send a calibrated frequency to the converting unit 504 according to the calibrated local frequency, and send line clock frequency recovery information. When a precise external clock source exists on the time synchronization apparatus locally, the frequency signal of the external clock source may also serve as a basis for calibrating the local frequency.

For example, supposing that a precise external clock source exists on the time synchronization apparatus locally, the second processing unit 506 receives BITS frequency signals sent by the frequency interface of the external clock source, the line clock frequency information including the clock frequency, and the reference frequency sent by the converting unit 504; obtains a local frequency according to a priority algorithm; and sends the calibrated frequency and the line clock frequency recovery information to the converting unit 504 according to the calibrated local frequency.

Figure 6:
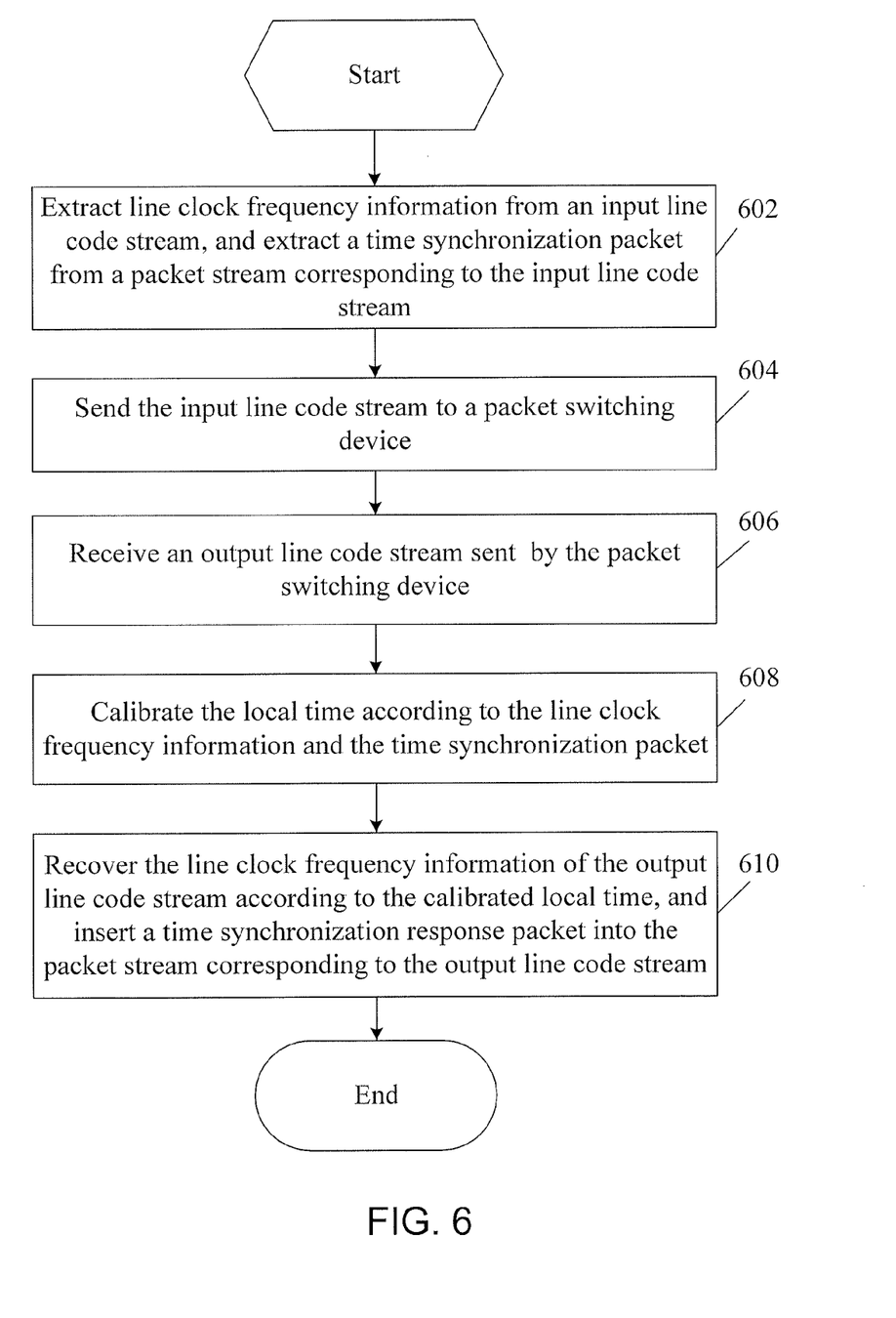
FIG. 6 is a flow chart of a time synchronization method according to an embodiment of the present invention.

The following describes an embodiment of the present invention with reference to FIG. 6.

FIG. 6 is a flow chart of a time synchronization method according to an embodiment of the present invention. The method includes:

602. Extract line clock frequency information from an input line code stream, and extract a time synchronization packet from a packet stream corresponding to the input line code stream. For example, the time synchronization apparatus extracts line clock frequency information including the clock frequency from the input line code stream, and extracts an IEEE1588 time synchronization packet from the packet stream corresponding to the input line code stream.

604. Send the input line code stream to a packet switching device.

606. Receive an output line code stream sent by the packet switching device.

608. Calibrate the local time according to the line clock frequency information and the time synchronization packet. For example, supposing that the time synchronization packet is an IEEE1588 packet, the time synchronization apparatus calibrates the local time according to the extracted line clock frequency information and the IEEE1588 time synchronization packet.

610. Recover the line clock frequency information of the output line code stream according to the calibrated local time, and insert a time synchronization response packet into the packet stream corresponding to the output line code stream. For example, supposing that the time synchronization response packet is an IEEE1588 response packet, the time synchronization apparatus recovers the line clock frequency information of the output line code stream according to the calibrated local time, and inserts an IEEE1588 time synchronization response packet into the packet stream corresponding to the output line code stream.

In the time synchronization method of the forgoing embodiment, depending on the specific requirement, optical-electric conversation or optical-electric-optical conversion may be performed for the input line code stream; and/or electric-optical conversion or optical-electric-optical conversion may be performed for the output line code stream.

Figure 7:
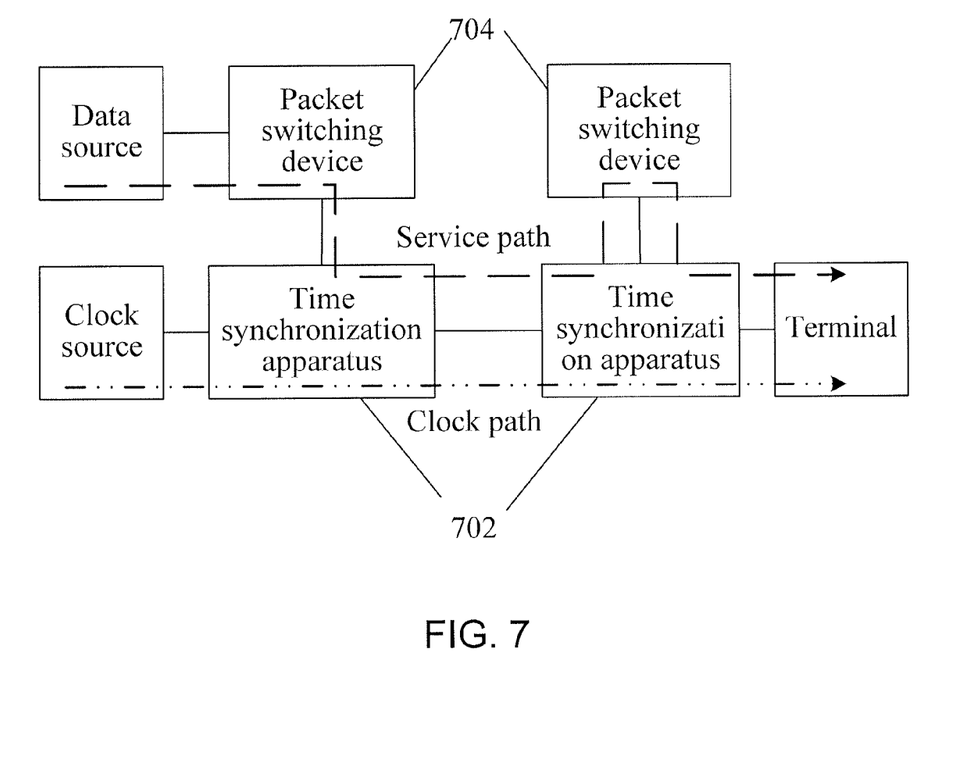
FIG. 7 is a block diagram of a time synchronization network according to an embodiment of the present invention.

The following describes an embodiment of the present invention with reference to FIG. 7.

FIG. 7 is a block diagram of a time synchronization network according to an embodiment of the present invention. The time synchronization network includes:

a time synchronization apparatus 702, configured to: extract line clock frequency information from an input line code stream, extract a time synchronization packet from a packet stream corresponding to the input line code stream, and send the input line code stream after extracting the line clock frequency information and the time synchronization packet to a packet switching device 704; receive an output line code stream sent by the packet switching device 704, calibrate local time according to the line clock frequency information and the time synchronization packet, recover line clock frequency information of the output line code stream according to the calibrated local time, and insert a time synchronization response packet into a packet stream corresponding to the output line code stream.

For example, supposing that the time synchronization packet is an IEEE1588 packet, the time synchronization apparatus 702 extracts line clock frequency information including the clock frequency from the input line code stream. The time synchronization apparatus 702 further extracts an IEEE1588 time synchronization packet from the packet stream corresponding to the input line code stream; sends the input line code stream after extracting the line clock frequency information and the time synchronization packet to the packet switching device 704; and receives the output line code stream sent by the packet switching device 704. The time synchronization apparatus 702 calibrates the local time according to the extracted line clock frequency information and the IEEE1588 time synchronization packet; recovers the line clock frequency information of the output line code stream according to the calibrated local time; and inserts an IEEE1588 time synchronization response packet into the packet stream corresponding to the output line code stream.

The packet switching device 704 is configured to receive the input line code stream, forward the packet stream corresponding to the input line code stream to a corresponding interface, and use a line code stream corresponding to the packet stream on the corresponding interface as output line code stream and send the output line code stream to the time synchronization apparatus. For example, the packet switching device 704 may be a router, a network bridge, a switch, an optical transceiver, or an optical modem.

In specific application scenarios of the time synchronization network, the connection between the packet switching device 704 and the time synchronization apparatus 702 may be set differently as required. The packet switching device 704 may be connected to the time synchronization apparatus 702 only, or may be connected to both the time synchronization apparatus 702 and the external network.

In this embodiment of the present invention, the network topology is changed. Before the change, two packet switching devices 704 are connected directly in a network that supports no time synchronization; after the change, the packet switching device 704 is connected to the time synchronization apparatus 702 first, and different time synchronization apparatuses 702 are interconnected. The service path is isolated from the clock path, and the time synchronization network may be deployed without requiring the packet switching device 704 to support the time synchronization function.

In the technical solutions provided by the embodiments of the present invention, the line clock frequency information is extracted from the input line code stream, and the time synchronization packet is extracted from the packet stream corresponding to the input line code stream. In this way, the clock path is isolated from the service path, and the time synchronization network may be deployed without requiring the packet switching device to support the time synchronization function, and the existing IP network can be upgraded to the time synchronization network smoothly.

Persons of ordinary skill in the art may understand that all or part of the steps of the method according to the embodiments of the present invention may be implemented by a program instructing relevant hardware. The program may be stored in computer readable storage media. The storage medium may be a Read-Only Memory (ROM), a Random Access Memory (RAM), a magnetic disk, or an optical disk, etc.

To sum up, the above descriptions are merely some exemplary embodiments of the present invention, but not intended to limit the scope of the present invention. Any variation or replacement that may be easily derived by those skilled in the art within the technology scope disclosed in the present invention shall fall within the protection scope of the present invention. Therefore, the protection scope of the present invention is subject to the appended claims.

What is claimed is:

1. A non-transitory computer readable medium including computer executable instructions that facilitate performing the steps of:
   extracting line clock frequency information from an input line code stream, extracting a time synchronization packet from a packet stream corresponding to the input line code stream, and sending the line clock frequency information and the time synchronization packet wherein the line clock frequency information includes a clock frequency;
   calibrating local time according to the line clock frequency information and the time synchronization packet, and sending a time synchronization response packet and line clock frequency recovery information according to the calibrated local time wherein the line clock frequency recovery information includes the calibrated clock frequency; and
   inserting the time synchronization response packet into a packet stream corresponding to an output line code stream, and recovering line clock frequency information of the output line code stream according to the line clock frequency recovery information.

2. The non-transitory computer readable medium according to claim 1, wherein the extracting line clock frequency information from an input line code stream, extracting a time synchronization packet from a packet stream corresponding to the input line code stream, and sending the line clock frequency information and the time synchronization packet wherein the line clock frequency information includes a clock frequency comprises:
   terminating physical-layer codes of the input line code stream, extracting the line clock frequency information from the input line code stream, sending the line clock frequency information, and sending the processed input line code stream;
   identifying the corresponding packet stream in the input line code stream, extracting the time synchronization packet when the packet in the packet stream is the time synchronization packet and a destination address of the time synchronization packet matches the local address, sending the time synchronization packet, and sending the processed input line code stream; and
   recovering the physical-layer codes of the input line code stream.

3. The non-transitory computer readable medium according to claim 2, wherein:
   the recovering the physical-layer codes of the input line code stream further comprises recovering the line clock frequency information of the input line code stream according to the line clock frequency recovery information.

4. The non-transitory computer readable medium according to claim 1, wherein the inserting the time synchronization response packet into a packet stream corresponding to an output line code stream, and recovering line clock frequency information of the output line code stream according to the line clock frequency recovery information comprises:
   terminating physical-layer codes of the output line code stream, and sending the processed output line code stream;
   inserting the time synchronization response packet into the packet stream corresponding to the output line code stream, and sending the processed output line code stream to the second outputting unit; and
   recovering the physical-layer codes of the output line code stream, and recovering the line clock frequency information of the output line code stream according to the line clock frequency recovery information.

5. The non-transitory computer readable medium according to claim 4, wherein:
   the terminating physical-layer codes of the output line code stream, and sending the processed output line code stream further comprises extracting the line clock frequency information from the output line code stream, and sending the line clock frequency information.

6. The non-transitory computer readable medium according to claim 1, wherein a basis for calibrating the local time, further includes:
   time pulse signals of an external clock source; and/or
   frequency signals of the external clock source.

7. The non-transitory computer readable medium according to claim 1, wherein the calibrating local time according to the line clock frequency information and the time synchronization packet, and sending a time synchronization response packet and line clock frequency recovery information according to the calibrated local time wherein the line clock frequency recovery information includes the calibrated clock frequency comprises:
  calibrating system time according to the time synchronization packet and a reference frequency, sending a system time pulse signal according to the calibrated system time, and sending the time synchronization response packet;
  calibrating local time according to the system time pulse signal and a calibrated frequency, and sending a reference frequency according to the calibrated local time; and
  calibrating a local frequency according to the line clock frequency information and the reference frequency, sending a calibrated frequency according to the calibrated local frequency, and sending line clock frequency recovery information.

8. A time synchronization method, comprising:
  extracting line clock frequency information from an input line code stream, and extracting a time synchronization packet from a packet stream corresponding to the input line code stream wherein the line clock frequency information includes a clock frequency;
  sending the input line code stream after extracting the line clock frequency information and the time synchronization packet in the corresponding packet stream to a packet switching device;
  receiving an output line code stream sent by the packet switching device; and
  calibrating local time according to the line clock frequency information and the time synchronization packet, recovering line clock frequency information of the output line code stream according to the calibrated local time, and inserting a time synchronization response packet into a packet stream corresponding to the output line code stream wherein recovering the line clock frequency information of the output line code stream comprises recovering the line clock frequency information of the output line code stream according to line clock frequency recovery information wherein the line clock frequency recovery information includes the calibrated clock frequency.

9. A time synchronization network, comprising:
  a time synchronization apparatus, configured to: extract line clock frequency information from an input line code stream wherein the line clock frequency information includes a clock frequency, extract a time synchronization packet from a packet stream corresponding to the input line code stream, and send the input line code stream after extracting the line clock frequency information and the time synchronization packet in the corresponding packet stream to a packet switching device; receive an output line code stream sent by the packet switching device, calibrate local time according to the line clock frequency information and the time synchronization packet, recover line clock frequency information of the output line code stream according to the calibrated local time, and insert a time synchronization response packet into a packet stream corresponding to the output line code stream wherein recovering the line clock frequency information of the output line code stream comprises recovering the line clock frequency information of the output line code stream according to line clock frequency recovery information wherein the line clock frequency recovery information includes the calibrated clock frequency; and
  a packet switching device, configured to receive the input line code stream, forward the packet stream corresponding to the input line code stream to a corresponding interface, and use a line code stream corresponding to the packet stream on the corresponding interface as output line code stream and send the output line code stream to the time synchronization apparatus.

* * * * *